United States Patent
Ebert

(10) Patent No.: US 9,527,346 B2
(45) Date of Patent: Dec. 27, 2016

(54) SPINDLE NUT ASSEMBLY AND METHOD OF INSTALLATION

(71) Applicant: James L. Ebert, Huron, OH (US)

(72) Inventor: James L. Ebert, Huron, OH (US)

(*) Notice: Subject to any disclaimer, the term of this patent is extended or adjusted under 35 U.S.C. 154(b) by 106 days.

(21) Appl. No.: 14/321,088

(22) Filed: Jul. 1, 2014

(65) Prior Publication Data

US 2015/0000106 A1  Jan. 1, 2015

Related U.S. Application Data

(63) Continuation-in-part of application No. 13/838,950, filed on Mar. 15, 2013, now Pat. No. 9,272,574.

(51) Int. Cl.
| | |
|---|---|
| *B60B 27/00* | (2006.01) |
| *F16B 39/02* | (2006.01) |
| *F16C 35/063* | (2006.01) |
| *B60B 35/00* | (2006.01) |
| *B60B 27/06* | (2006.01) |

(52) U.S. Cl.
CPC ......... *B60B 27/0078* (2013.01); *F16B 39/028* (2013.01); *F16C 35/063* (2013.01); *B60B 27/06* (2013.01); *B60B 35/004* (2013.01); *B60B 2900/113* (2013.01); *Y10T 29/49696* (2015.01); *Y10T 29/49963* (2015.01)

(58) Field of Classification Search
CPC ....... F16B 39/028; F16B 39/103; B23P 19/06; B60B 27/02
USPC .............................. 301/105.1, 111.03, 124.1
See application file for complete search history.

(56) References Cited

U.S. PATENT DOCUMENTS

| | | | | |
|---|---|---|---|---|
| 5,266,008 A | * | 11/1993 | Ehrbar | .................... B64C 27/32 411/429 |
| 5,609,456 A | * | 3/1997 | Joki | ...................... F16B 39/028 411/291 |
| 5,674,034 A | * | 10/1997 | Bennett | ................... F16B 39/10 411/120 |
| 6,290,442 B1 | * | 9/2001 | Peterkort | ............. F16B 41/002 411/120 |
| 2007/0215032 A1 | * | 9/2007 | Melberg | ................. G01K 13/08 116/218 |
| 2011/0291468 A1 | * | 12/2011 | Rieger | ............... B60B 27/0005 301/105.1 |

* cited by examiner

*Primary Examiner* — Jason L Vaughan
*Assistant Examiner* — Amanda Meneghini
(74) *Attorney, Agent, or Firm* — David D. Murray; Vivacqua Law PLLC

(57) ABSTRACT

An apparatus for and a method of securing hubs and bearings on truck spindles includes a first or inner nut, a locking ring or washer and a second or outer nut. The inner nut includes a plurality of axially oriented threaded openings. The locking ring or washer includes a radially inwardly directed key and fastener receiving features. The outer nut includes through aligned, axially oriented openings. A plurality of threaded fasteners extend through the openings in the outer nut, through the fastener receiving features in the locking ring and into the threaded openings in the inner nut. A method of installation is also presented.

16 Claims, 12 Drawing Sheets

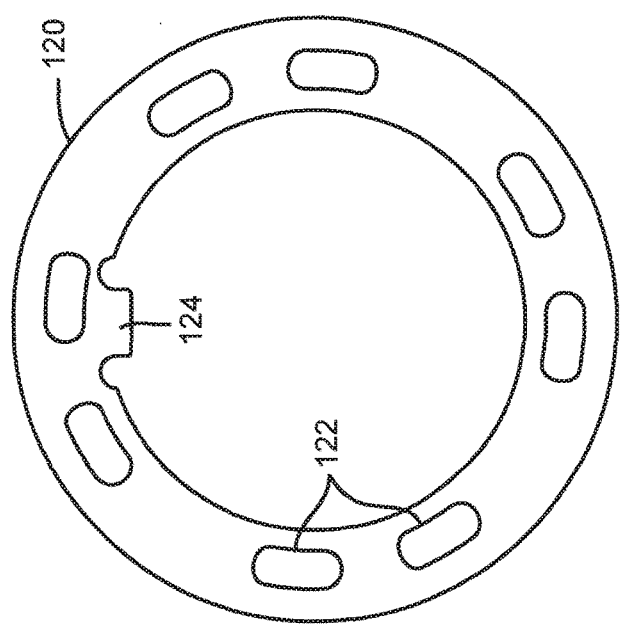
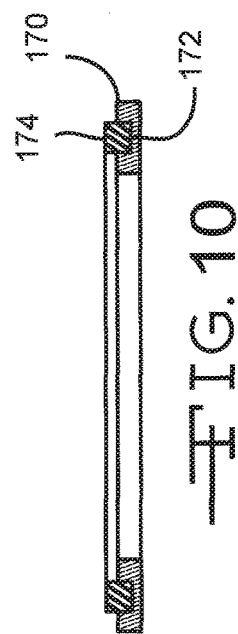
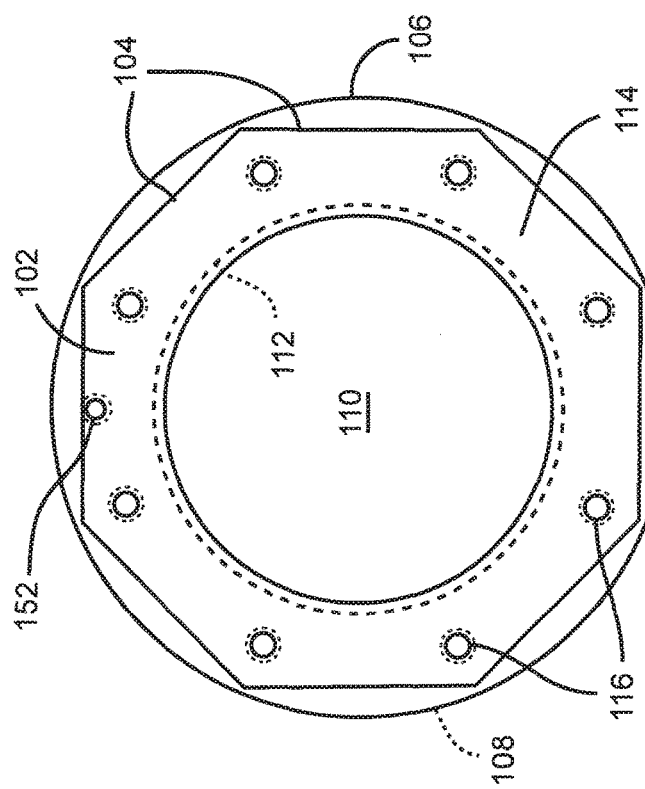
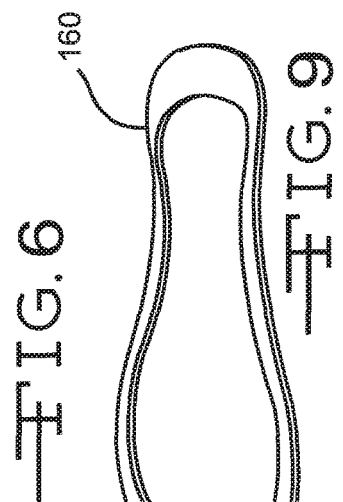

SPINDLE NUT ASSEMBLY AND METHOD OF INSTALLATION

CROSS REFERENCE TO CO-PENDING APPLICATION

This patent application is a continuation-in-part application of U.S. patent application Ser. No. 13/838,950, filed Mar. 15, 2013, now U.S. Pat. No. 9,272,574, granted Mar. 1, 2016.

FIELD

The present disclosure relates to apparatus for retaining hubs on truck axle spindles and more particularly to nut and washer assemblies for securing hubs on truck axle spindles and a method of utilizing the same.

BACKGROUND

The statements in this section merely provide background information related to the present disclosure and may or may not constitute prior art.

Long haul trailers of semi-tractors and trailers may readily log over one hundred thousand miles a year. After the tires, the most significant wear item is the interface between the rotating tires and wheels and the stationary axles. This interface includes pairs of roller bearings which support each tire and wheel assembly on each axle.

Although well designed, the failure of the bearings and damage to the terminal portion of the axle, the spindle, is essentially a matter of time. That said, such failures are seldom predictable and it thus has not been found reasonable or economically practical to undertake preventative maintenance which typically includes replacement of these components. The result of the foregoing is that failure of these truck axle components will generally occur without warning and at some distance from a truck terminal or qualified repair facility.

I have therefore developed several on-site axle repair machines, components and procedures that render the repair of such truck axle failures at the failure site rapid, efficient, safe and far less expensive than towing the truck or trailer to a repair facility and replacing the entire axle. For example, my U.S. Pat. No. 6,024,418 discloses a repair method utilizing a long spindle having both inner and outer bearing surfaces and a sleeve or liner. After the damaged end of the axle has been removed, the spindle and liner are installed in the axle and welded at several locations away from regions of significant stress.

Whether completing the repair process described directly above or simply re-assembling a wheel hub and bearings after inspection and lubrication, one of the final steps is the re-installation of a washer and nut to retain the wheel hub and bearings on the threaded spindle. In one arrangement, the nut is a pair of thin nuts. A first or inner nut is tightened down to a specified torque to provide a preload on the bearings and then a second nut is rotated against the first nut to lock it in place.

This arrangement is not ideal for two reasons. First of all, although the first nut can be accurately torqued down to provide the proper bearing preload, when the second (lock) nut is tightened against it, the preload will generally increase to an unknown value. This is because the first nut, as it is tightened or torqued down, is forced away from the bearings and toward the inside faces of the threads on the spindle. However, when the second (lock) nut is tightened against it, it moves slightly inward such that it resides against the outside faces of the threads. This axial translation will increase the bearing preload by some unknown amount. Thus, even if the first nut were initially properly tightened or torqued to apply the proper bearing preload, tightening the second (lock) nut will increase the bearing preload. Second of all, the second (lock) nut which, when tightened, is carrying essentially all of the axial force is thin and can thus distort or damage the small number of spindle threads it is engaging under certain conditions. This, in turn, may make removal of the outer nut difficult or virtually impossible.

Another arrangement utilizes a nut with plural locking features that can be engaged by a pin that is held against rotation by a keyway on the spindle. Again, the nut is torqued down against the wheel and bearings to provide the proper preload. Now, however, since the locking features are spaced about the nut at, for example, 30 degree circumferential intervals, the nut must be rotated (typically back or out) to align a locking feature with the pin. Such rotation changes, and typically reduces, the optimum bearing preload.

From the foregoing, it is apparent that there is a need for improved components and an installation method addressing the problems of properly mounting, preloading bearings and tightening truck axle spindle nuts. The present invention is so directed.

SUMMARY

The present invention provides an apparatus for and a method of securing wheel hubs and bearings on truck axles or spindles. The preferred embodiment of the apparatus includes a flat or non-flat washer such as a frusto-conical (Belleville spring) washer or a wave washer having a key and a nut having an integral and axially spaced apart locking plate or ring with male threads in a center opening in the nut and locking ring complementary to threads on an axle or spindle. The nut also includes a plurality of axially oriented smaller threaded openings, and a plurality of complementary threaded fasteners that extend through apertures in the locking ring and into the threaded openings. An alternate embodiment of the apparatus includes a flat or non-flat washer, a nut having a center opening and threads complementary to threads on an axle or spindle and a plurality of axially oriented smaller threaded openings, a locking plate or ring having a pattern of arcuate slots and a key which engages a keyway on the spindle and a plurality of fasteners which secure the locking plate to the nut in a desired position.

The method includes the steps of first assembling the bearings and hub on the axle (spindle). Next, the washer is placed on the spindle with the key in the keyway of the spindle and the nut is threaded onto the spindle and the nut is tightened until the desired bearing preload is achieved. If the non-flat washer is being utilized, it will be compressed until it is nearly flat. A feeler gauge or a dial indicator may be utilized to make this determination. Then, without disturbing the rotational position of the nut, and with regard to the first embodiment nut described above, the plurality of machine screws in the locking ring are tightened to distort the ring and tightly secure the nut to the spindle. With the alternate embodiment nut, the locking ring is disposed on the spindle so that both the key is in the spindle keyway and several of the arcuate slots line up with the threaded openings in the nut, the fasteners are tightened to secure the locking ring to the nut and prevent rotation of the nut.

Another embodiment of the invention includes a first or inner nut, a locking ring or washer and a second or outer nut. The inner nut includes a center threaded opening, exterior wrench engageable flats and a plurality of axially oriented threaded openings. The locking ring or washer includes a radially inwardly directed key and fastener receiving features. The outer nut includes a center threaded opening and a plurality of through aligned, axially oriented openings. When installed on a spindle, a plurality of threaded fasteners extend through the openings in the outer nut, through the fastener receiving features in the locking ring and into the threaded openings in the inner nut. A method of installing this embodiment of the invention is also disclosed.

Thus it is an aspect of the present invention to provide a nut assembly for securing a wheel hub to a truck, tractor or trailer axle or spindle.

It is a further aspect of the present invention to provide an assembly for a truck, tractor or trailer axle having a flat or non-flat washer, a nut and a locking ring.

It is a further aspect of the present invention to provide an assembly for a truck, tractor or trailer axle having a spring washer, a nut and a locking ring.

It is a still further aspect of the present invention to provide an assembly for a truck, tractor or trailer axle having a flat or non-flat washer, a nut and an integral locking ring.

It is a still further aspect of the present invention to provide an assembly for a truck, tractor or trailer axle having an inner nut, a locking ring or washer and an outer nut.

It is a still further aspect of the present invention to provide an assembly for a truck, tractor or trailer axle having an inner nut with a plurality of threaded axial openings, a locking ring or washer with a plurality of fastener receiving features and an outer nut.

It is a still further aspect of the present invention to provide an assembly for a truck, tractor or trailer axle having an inner washer, a nut with a plurality of threaded axial openings, a locking ring or washer with a key and an outer nut with a plurality of through openings.

It is a still further aspect of the present invention to provide method for securing a wheel hub and bearings to a truck, tractor or trailer axle.

It is a still further aspect of the present invention to provide method for securing a wheel hub and bearings to a truck, tractor or trailer axle utilizing an inner nut, a locking ring or washer and an outer nut.

It is a still further aspect of the present invention to provide a method of assembling a hub on a truck, tractor or trailer spindle having a pair of bearings including the steps of installing an inner nut, installing a locking ring having a key adjacent said inner nut with said key in a keyway of such spindle and installing an outer nut adjacent said locking ring.

It is a still further aspect of the present invention to provide a method of assembling a hub on a truck, tractor or trailer axle spindle having inner and outer bearings including the steps of installing a washer adjacent such outer bearing, installing an inner nut adjacent said washer, installing a locking ring having a key adjacent said inner nut with said key in a keyway of such spindle and installing an outer nut adjacent said locking ring.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a plan view of an alternate embodiment octagonal nut according to the present invention;

FIG. 7 is a plan view of an alternate embodiment locking ring according to the present invention;

FIG. 9 is a side elevational view of another alternate embodiment non-flat washer such as a wave washer;

FIG. 10 is a side elevational view of yet another alternate embodiment spring washer including an elastomeric O-ring;

DETAILED DESCRIPTION

The following description is merely exemplary in nature and is not intended to limit the present disclosure, application, or uses.

Figure 1:
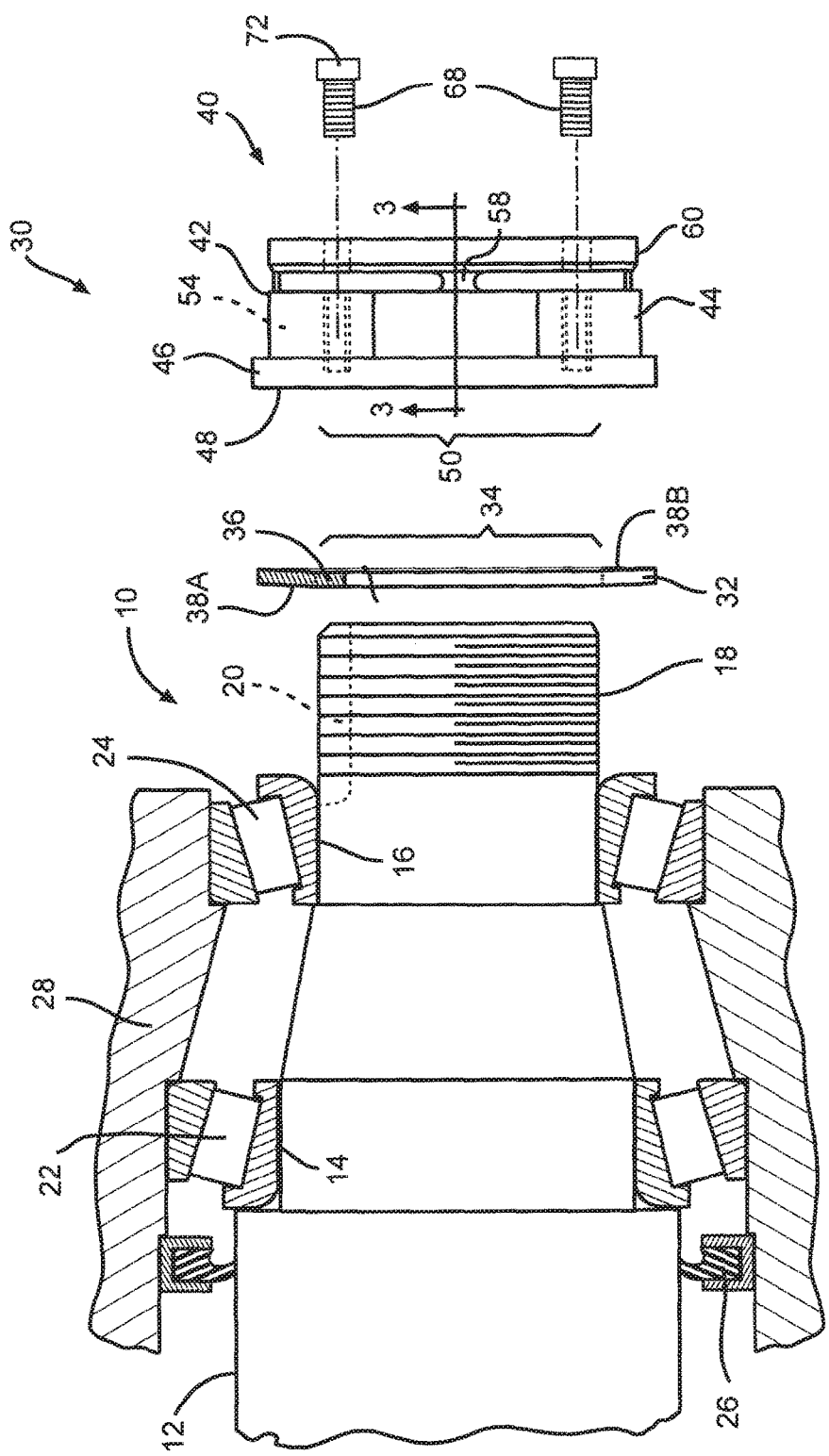
FIG. 1 is an exploded, side elevational view of a motor vehicle axle (spindle) and a first embodiment washer and nut and locking ring assembly according to the present invention.
Figure 2:
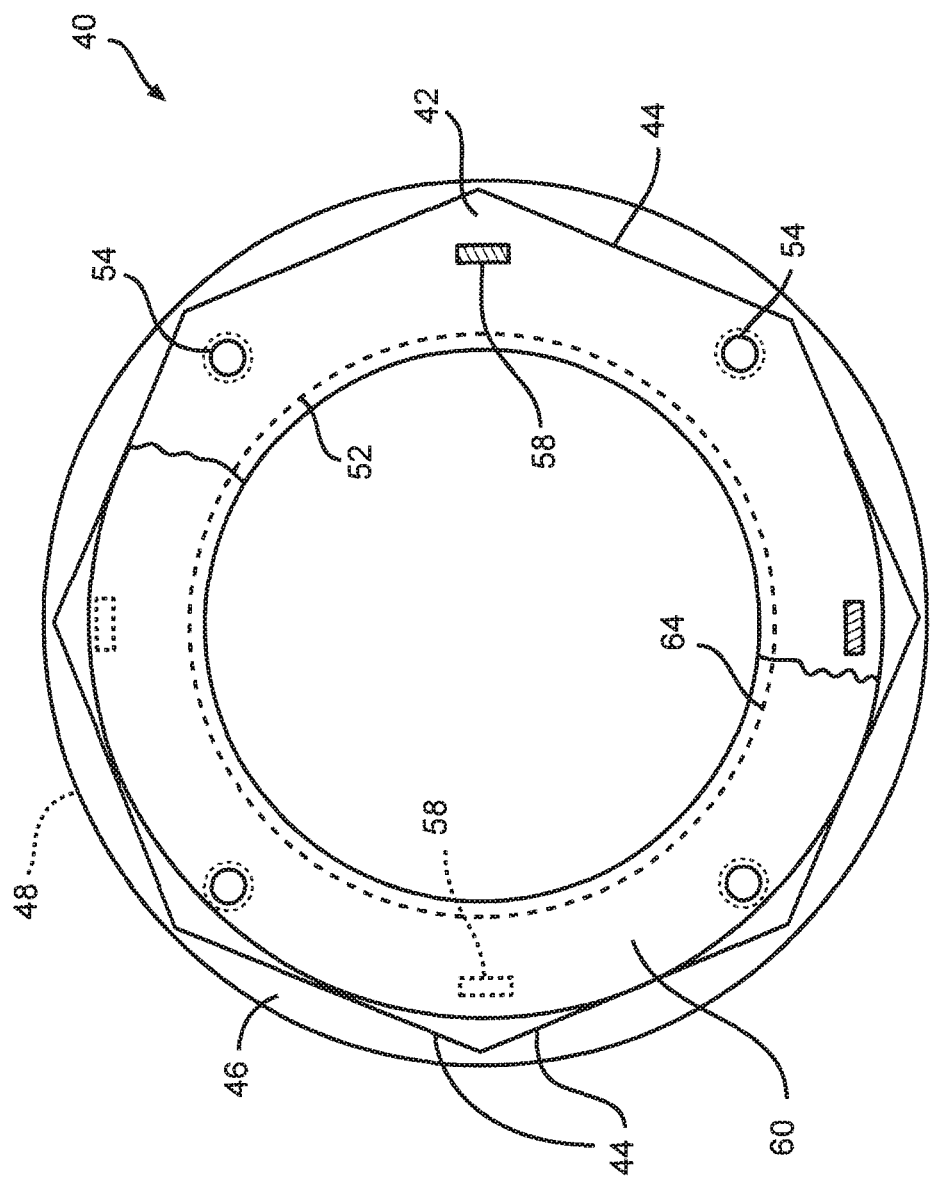
FIG. 2 is a plan view of a first embodiment octagonal nut and locking ring assembly according to the present invention with a portion of the locking ring broken away.

With reference to FIGS. 1 and 2, a typical and exemplary motor vehicle truck tractor or trailer spindle is illustrated and generally designated by the reference number 10. As utilized herein, the term "spindle" means and refers to the terminal portion of either a truck tractor or trailer axle. The spindle 10 includes an oil seal surface 12, an inner bearing surface 14, an outer bearing surface 16 axially spaced from the inner bearing surface 14, a region of male threads 18 on a terminal portion of the spindle 10 and a keyway 20. The spindle 10 may be hollow and receive a drive axle, be plugged with a cylindrical elastomeric seal or be solid.

As noted above, the spindle 10 represents the interface between the stationary structure of the tractor or trailer frame and suspension and the rotating hub, wheel and tire. Thus, the spindle 10 receives and supports an inner tapered roller bearing assembly 22 on the inner bearing surface 14 and an outer tapered roller bearing assembly 24 on the outer bearing surface 16. The inner and outer tapered roller bearing assemblies 22 and 24 as well as an elastomeric oil seal 26 which contacts the oil seal surface 12 on the spindle 10 are, in turn, received within, supported and retained by a hub or wheel hub 28, a portion of which is illustrated in FIG. 1. The wheel hub 28 is circular, may be of various configurations and materials and receives and supports a wheel and tire assembly.

A first embodiment of a washer, nut and locking ring assembly 30 is disposed adjacent the outer tapered roller bearing assembly 24 and includes a flat or non-flat, i.e., frusto-conical or Belleville spring, washer 32. As indicated, the washer 32 may be either flat or have a shape such as a Belleville spring or wave washer that provides a spring biasing or restoring force when compressed. The special benefit to utilizing a spring washer will be described more extensively in the paragraphs devoted to the method of utilization appearing below. The washer 32 defines a circular opening 34 and includes a radially inwardly directed lug or key 36 that is complementary to and received within the keyway 20 of the spindle 10. The inside and outside diameters and the thickness and the angle of offset or conicity of the washer 32 if the washer is a spring washer will vary according to its application. The diameter of the circular opening 34 of the washer 32, that is, the inside diameter of the washer 32, will be determined by the major diameter of the male threads 18 on the terminal portion of the spindle 10.

Preferably, the diameter of the circular opening 34 will be just slightly larger than the major diameter of the male threads 18 on the spindle 10. The thickness of the washer 32, if it is a flat washer, will be determined primarily by its desired strength or, if it is a non-flat, i.e., spring washer, it will be determined primarily by the desired spring rate (constant). In either case, the thickness is preferably in the range of about 0.120 inches (3.05 mm.) to about 0.160 inches (4.06 mm.) or more or less. The axial conicity, if it is a spring washer, will be determined primarily by the desired compressive travel of the washer 32. Typically, the conicity may be in the range of from 0.003 inches (0.076 mm.) to 0.008 inches (0.203 mm.) or more with 0.005 inches (0.127 mm.) having been found to be a useful, average and typical value.

The washer 32, if it is a flat washer, may, of course, be simply placed on the spindle 10, as it is orientation insensitive. If it is a spring washer, in a relaxed state, it is preferably arranged on the spindle 10 with the convex face or surface 38A facing inward and the concave face 38B facing outward, that is, with the inner diameter more proximate the bearing surface 16 and the roller bearing assembly 24. It will be appreciated that, if it is a spring washer, the conicity, i.e., the non-flat shape, of the washer 32 has been exaggerated somewhat in FIG. 1, for purposes and reasons of explanation and clarity. It should also be appreciated that a non-flat, i.e., spring, washer 32 may be installed in the opposite direction on the spindle 10 such that it faces the opposite way as will be described subsequently.

An octagonal nut and integral locking ring assembly 40 includes an octagonal nut 42 having a plurality of, preferably eight, flats 44. While both the length of the flats 44 and the maximum apex to apex diametral distance of an eight sided, i.e., octagonal, nut 42 has been found optimum, and in fact preferred, for this service, it should be understood that more or fewer flats 44 on the nut 42, for example, six, ten or twelve may be utilized. Adjacent the flats 44, the octagonal nut 42 includes a circular flange 46 having a flat, end face or surface 48. The octagonal nut 42 includes an axial circular aperture 50 having female threads 52 which are complementary to the male threads 18 on the terminal portion of the spindle 10. Disposed about the circular aperture 50, preferably in a bolt circle or similar array, are a plurality of axially oriented threaded blind openings 54. As illustrated in FIG. 2, there are preferably four threaded blind openings 54 but it should be understood that more or fewer threaded openings 54 may be utilized if desired.

Referring now to FIGS. 1, 2, 3 and 4, connected to the octagonal nut 42 by a plurality of, preferably four, lugs, bridges, webs, stanchions or standoffs 58 and axially spaced therefrom is a deformable locking ring 60. Preferably, the locking ring 60 is integrally formed with the octagonal nut 42 from a single blank or piece of metal stock through suitable machining operations. The octagonal nut 42 and the locking ring 60 may, however, be assembled from two individually fabricated components that are secured together in the desired spaced apart relationship illustrated in FIGS. 1 and 3 by, for example, welding or a plurality of spacers and threaded fasteners.

Figure 3:
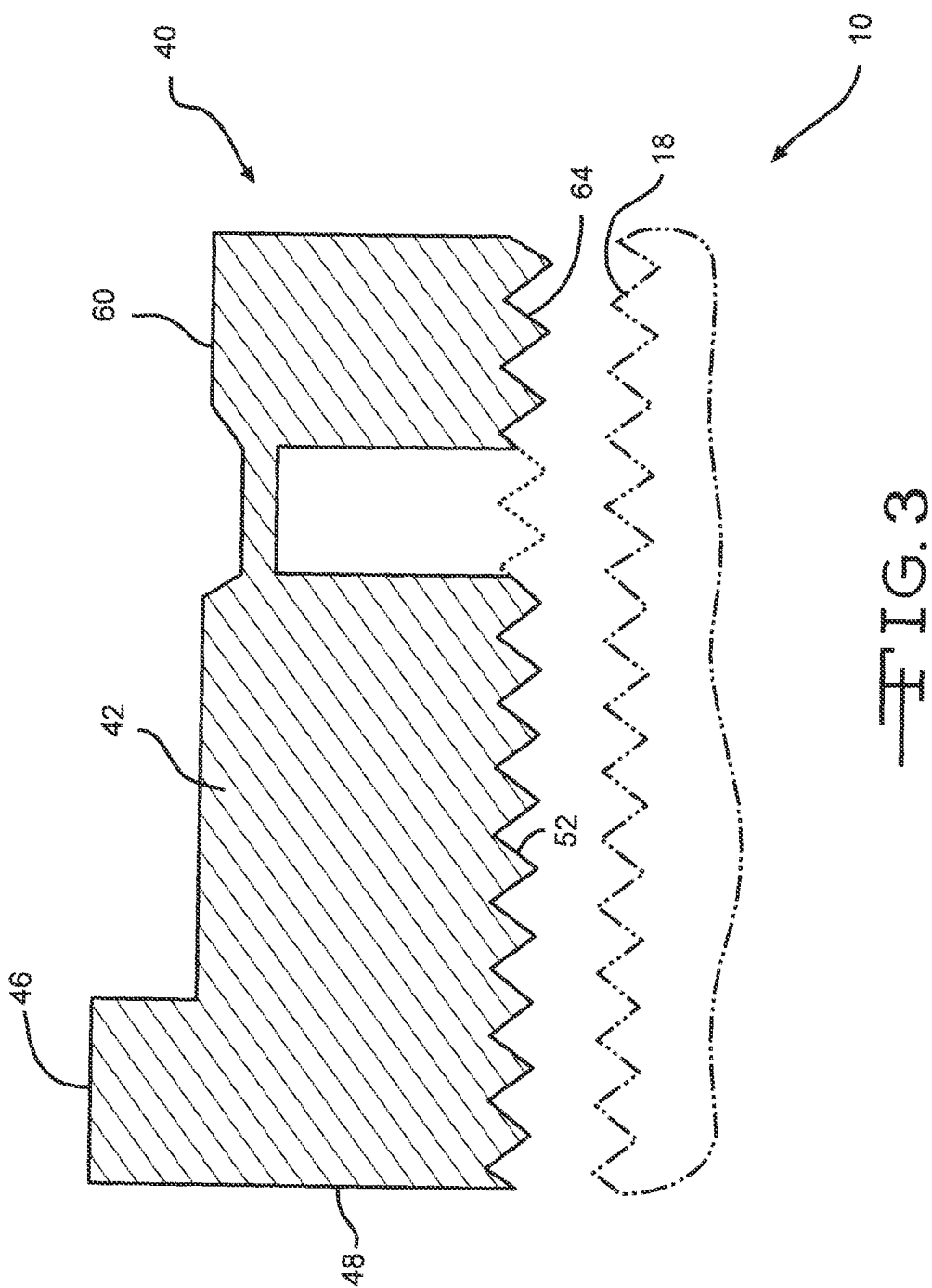
FIG. 3 is an enlarged, fragmentary, sectional view of the internal (female) threads of the nut and locking ring assembly according to the present invention taken along line 3-3 of FIG. 1.

The deformable locking ring 60 includes a circular aperture 62 having female threads 64 which, as illustrated in FIG. 3, are a continuation of the female threads 52 and the thread pitch in the octagonal nut 42 such that the male threads 18 of the terminal portion of the spindle 10, shown in phantom in FIG. 3, readily and smoothly engage both the female threads 52 of the octagonal nut 42 and the female threads 64 of the deformable locking ring 60.

The deformable locking ring 60 also includes a plurality of axially oriented smooth walled openings 66 that align with the threaded blind openings 54 in the octagonal nut 42 and receive, with a clearance fit, a like plurality of threaded fasteners such as machine screws 68. The machine screws 68 preferably include socket heads 72 that may be engaged by axially oriented tools such as an Allen wrench.

Figure 4:
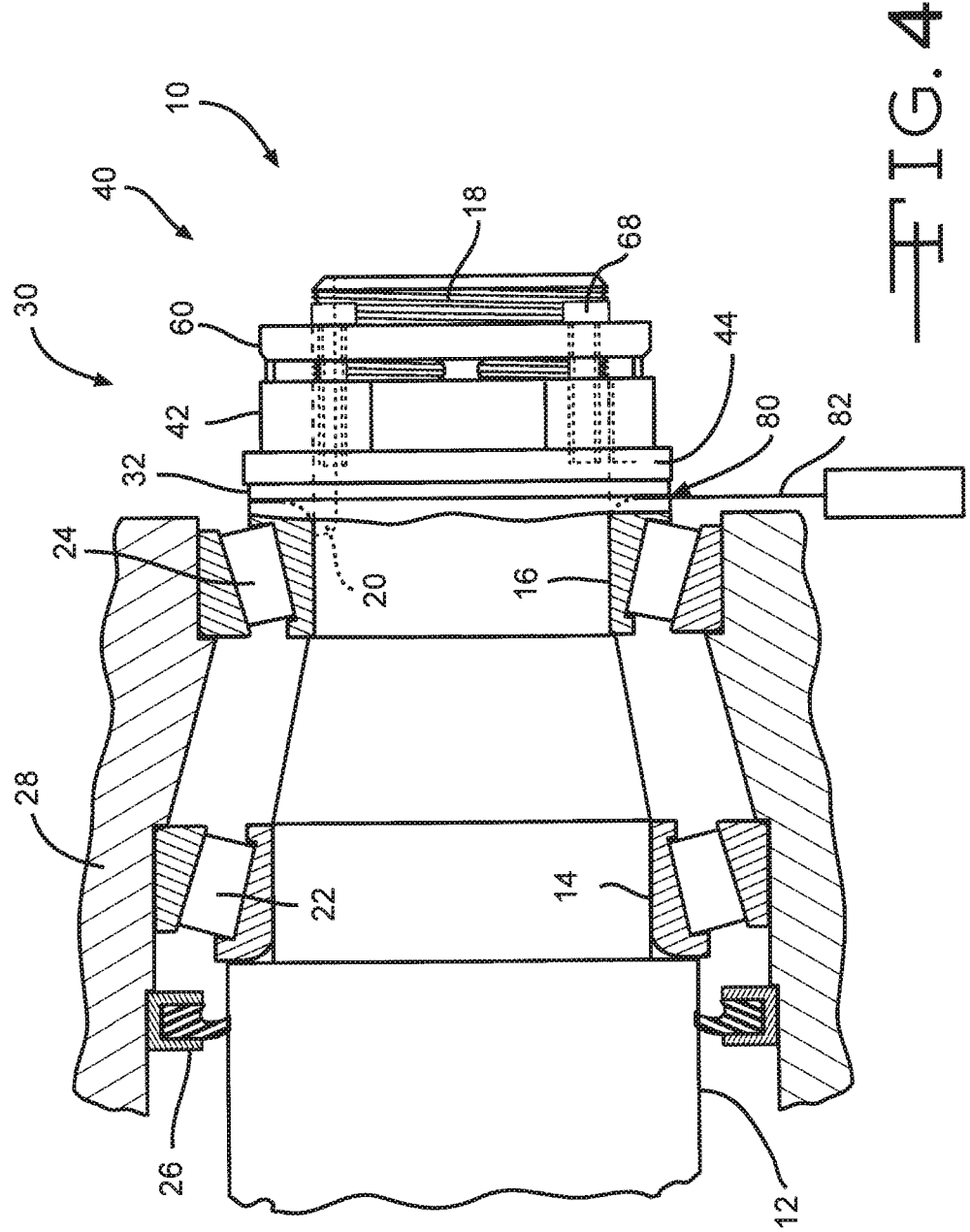
FIG. 4 is a fragmentary, side elevational view of a portion of a motor vehicle axle (spindle), a bearing, a non-flat spring washer, a nut and a feeler gauge measuring the deflection of the washer before tightening the screws on the locking ring.

Referring now to FIGS. 1 and 4, a method of mounting and securing the wheel hub 28 and preloading the pair of tapered roller bearing assemblies 22 and 24 on the spindle 10 according to the present invention will now be described. First of all, the hub 28, including the tapered inner roller bearing assembly 22 and the oil seal 26 are mounted on the spindle 10, as illustrated in FIGS. 1 and 4. Then, the tapered outer roller bearing assembly 24 and the washer 32, with its key 36 aligned with and received in the keyway 20 and, if it is a frusto-conical, i.e., Belleville spring washer, with its concave face or surface 38B preferably facing toward the outer end of the spindle 10, are placed on the end of the spindle 10.

At this juncture, there are three approaches to properly preloading the roller bearings 22 and 24 which may be practiced separately and independently of one another. A first approach, utilizing a flat washer 32, involves simply applying torque to the octagonal nut 42 until a desired axial preload on the inner and outer roller bearing assemblies 22 and 24 is achieved. When this has been accomplished, the machine screws 68 are tightened to deform the deformable locking ring 60, thereby securing the octagonal nut and integral locking ring assembly 40 to the spindle 12.

Figure 8:
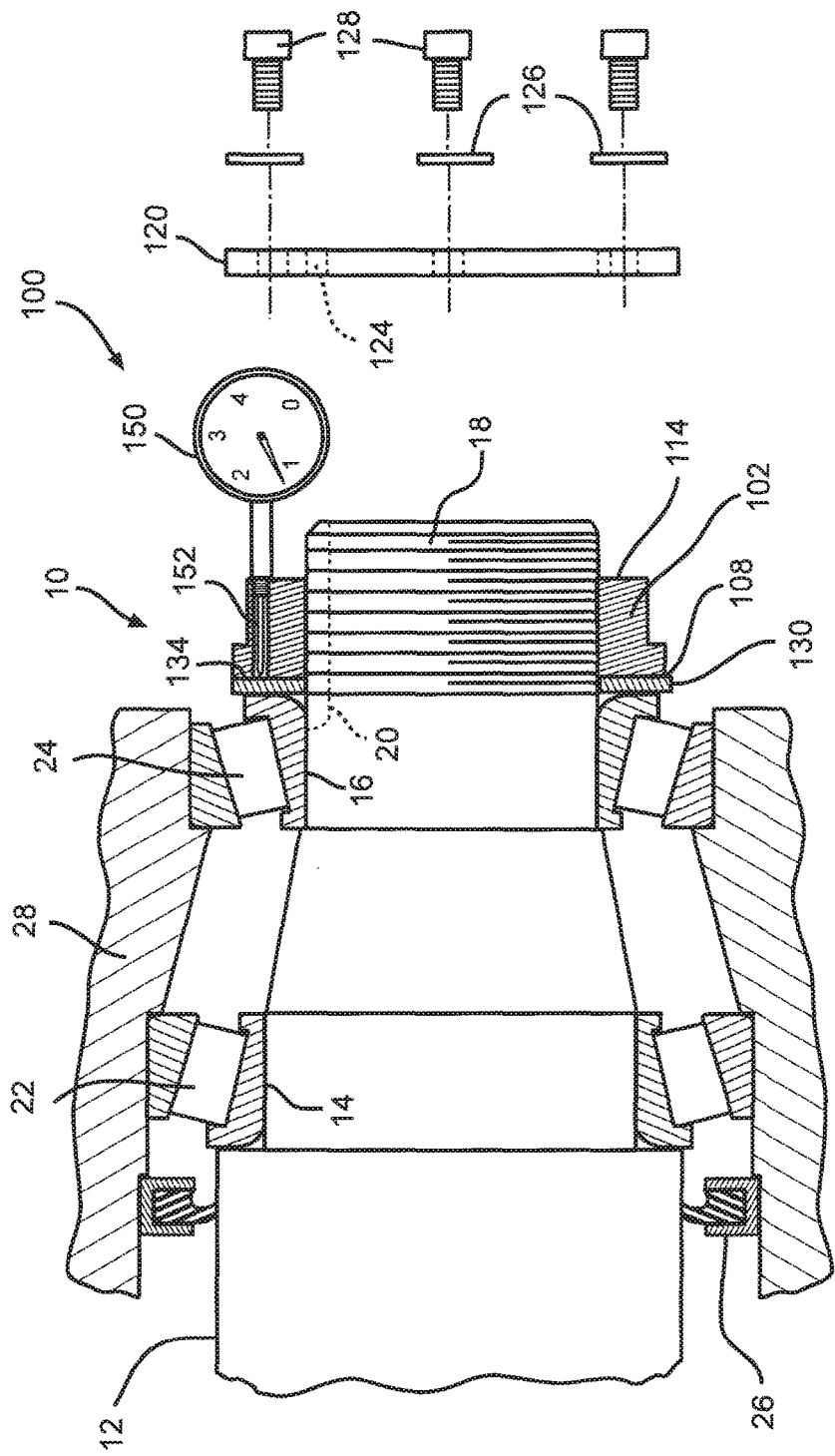
FIG. 8 is a fragmentary, side elevational view of a portion of a motor vehicle axle (spindle), a bearing, a non-flat spring washer, a nut and a dial indicator measuring the deflection of the washer before installing the locking ring a fasteners.

A second approach is illustrated in FIG. 4 and a third approach is illustrated in FIG. 8. In the second approach, the octagonal nut and the integral locking ring assembly 40 are threaded on to the male threads 18 of the spindle 10 and tightened (torqued) down against the non-flat spring washer 32 until a small but measurable gap or clearance 80, such as 0.001 inches (0.025 mm.) or 0.0015 inches (0.037 mm.) exists between the outer edge of the non-flat washer 32 and the face of the outer roller bearing assembly 24.

To measure this gap or clearance 80, the first approach involves use of a feeler gauge 82 having a thickness of, for example, 0.001 inches (0.025 mm.) or 0.0015 inches (0.037 mm.), the width of the desired gap or clearance 80. Thus, the octagonal nut and integral locking ring assembly 40 are rotated and tightened on the male threads 18 of the spindle 10 until the feeler gauge 82 just slides radially into the gap or clearance 80 about the periphery of the non-flat spring washer 32 indicating that the non-flat spring washer 32 has been deformed to the desired extent so that it is applying a desired preload. Finally, without rotating the octagonal nut and integral locking ring assembly 40, the machine screws 68 are tightened to slightly deform or distort the locking ring 60 so that the octagonal nut 42 and the locking ring 60 are securely and non-rotatably locked to the spindle 10 to ensure maintenance of the preload on the inner and outer roller bearing assemblies 22 and 24. It will be appreciated that the key 36 in the washer 32 inhibits its rotation and thus the transfer of any rotational motion from the outer roller bearing assembly 24 or the hub 28 to the nut and locking ring assembly 40, thereby additionally ensuring maintenance of its position and the bearing preload. With the exception of a grease cap or other cosmetic component, the installation of the wheel hub 28 on the spindle 10 is now complete.

As noted above, the thickness of the non-flat spring washer 32 primarily determines its spring rate (constant) and the deflection of the non-flat spring washer 32 determines the preload on the roller bearings 22 and 24, and a gap or clearance 80 of about 0.001 inches to about 0.0015 inches has been found to be a functional, nominal value. Larger, but generally not smaller, gaps or clearances 80 may be set depending upon the desired preload of the roller bearings 22 and 24 and the initial (relaxed) configuration, the thickness and the spring constant of the non-flat spring washer 32.

Creating and maintaining this gap or clearance 80 during assembly is critical because with it, a certain non-flat spring washer 32 will provide a certain preload on the roller bearings 22 and 24 if so compressed and substantially flattened. If the gap or clearance 80 is larger than desired, it is apparent the preload on the roller bearings 22 and 24 will be less than desired. However, if the gap or clearance 80 is non-existent, i.e., the octagonal nut and locking ring assembly 40 has been over-tightened, such that there is no longer any gap or clearance 80 between the non-flat washer 32 and the outer roller bearing assembly 24, the extent of bearing preload is simply unknown. Is the preload a few pounds over that desired? Is it one hundred pounds over that desired?

Figure 5:
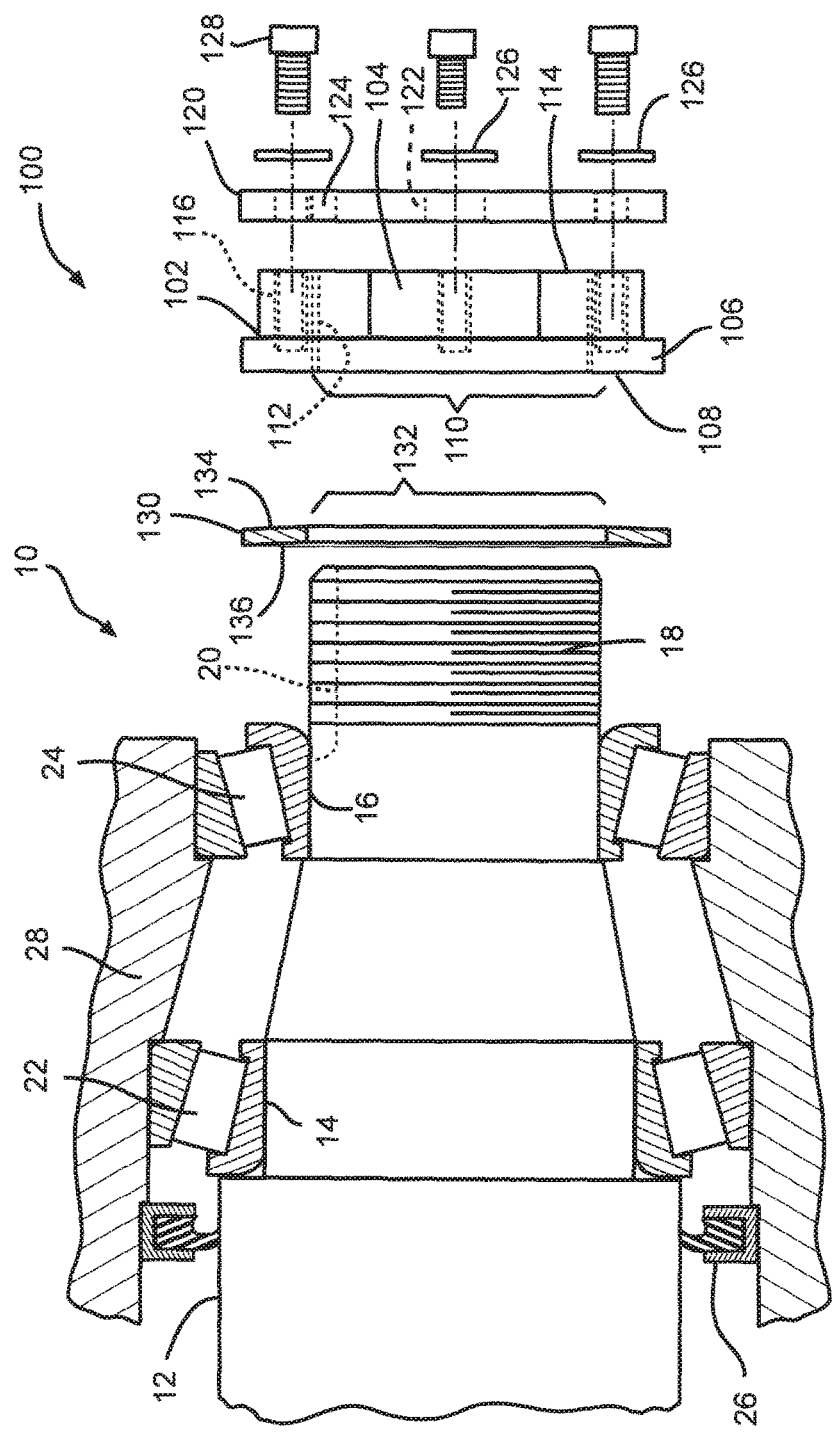
FIG. 5 is an exploded, side elevational view of a motor vehicle axle (spindle) and an alternate embodiment washer, nut and locking ring assembly according to the present invention.

Referring now to FIGS. 5, 6 and 7, an alternate embodiment washer, nut and locking ring assembly, according to the present invention and designated by the reference number 100, is illustrated. The alternate embodiment washer, nut and locking ring assembly 100 is utilized with the same motor vehicle axle (spindle) components such as the spindle 10 having the oil seal surface 12, the inner bearing surface 14, the outer bearing surface 16, the region of male threads 18 and the keyway 20. Disposed thereon are the inner tapered roller bearing assembly 22, the outer tapered roller bearing assembly 24, the elastomeric oil seal 26 and the wheel hub or hub 28. The alternate embodiment washer, nut and locking ring assembly 100 includes an octagonal nut 102 also preferably having eight flats 104 and an adjacent circular flange 106 defining a flat, radially extending inner end face 108. While both the length of the flats 104 and the maximum apex to apex diametral distance of an eight sided, i.e., octagonal, nut 102 has been found optimum for this application, it should be understood that more or fewer flats 104 on the nut 102, for example, six, ten or twelve may be utilized. The octagonal nut 102 includes an axial circular aperture 110 having female threads 112 which are complementary to the male threads 18 on the terminal portion of the spindle 10.

On an outer end face 114 of the octagonal nut 100 opposite the flat, inner end face 108 are a plurality of, preferably eight, blind, axially extending threaded openings 116. A locking ring 120 having an inside diameter just slightly larger than the major diameter of the male threads 18 on the spindle 10 includes a plurality of arcuate slots 122 and an inwardly extending key 124 which is complementary to the keyway 20 in the spindle 10. The locking ring 120 is retained on the outer end face 114 of the octagonal nut 100 by a plurality of flat washers 126 and threaded fasteners 128, such as hex head machine screws. Because of the arrangement of the arcuate slots 122 relative to the key 124, the pattern of arcuate slots 122 need not repeat around the locking ring 120, thereby eliminating some machining of the locking ring 120. It should be understood, however, that a uniform pattern of arcuate slots 122 about the locking ring 120 may be provided, if desired, and is fully within the scope of the present invention.

The alternate embodiment washer, nut and locking ring assembly 100 also preferably includes a flat or non-flat, i.e., frusto-conical or Belleville spring, washer 130 disposed between the outer tapered roller bearing assembly 24 and the flat, inner end face 108 of the octagonal nut 102. The flat or non-flat, i.e., frusto-conical or Belleville spring, washer 130 defines a circular opening 132. It the washer 130 is a non-flat washer, the inside and outside diameters, the thickness and the angle of offset or conicity of the non-flat washer 130 will vary according to its application, as noted above.

The diameter of the circular opening 132 of the washer 130, that is, the inside diameter, will be determined by the major diameter of the male threads 18 on the terminal portion of the spindle 10. Preferably, the diameter of the circular opening 132 will be just slightly larger that the outside diameter of the male threads 18 on the spindle 10. The thickness of the washer 130, if it is a flat washer, will be primarily determined by its desired strength or, if it is a non-flat, i.e., spring washer, it will be primarily determined by the desired spring rate (constant). In either case, the thickness is typically between about 0.120 inches (3.05 mm.) and 0.160 inches (4.06 mm.), or more or less. If it is a non-flat washer, the axial conicity will be primarily determined by the desired compressive travel (deformation) of the washer 130. Typically, the conicity may be in the range of from 0.003 inches (0.076 mm.) to 0.008 inches (0.203 mm.) or more with 0.005 inches (0.127 mm.) having been found to be a useful, average and typical value.

While the flat washer 130 is not orientation sensitive, the non-flat, frusto-conical spring washer 130, in a relaxed state, is preferably arranged on the spindle 10 with a convex face or surface 134 facing outward and a concave face 136 facing inward. It will be appreciated that the non-flat shape of the spring washer 130 has been exaggerated somewhat in FIG.

5, for purposes and reasons of explanation and clarity. It should also be appreciated that the spring washer 130 may be installed in the opposite direction on the spindle 10 such that it faces the opposite way as described above, if desired. Finally, it should be appreciated that because the octagonal nut 102 includes the flat inner end face 108 and the locking ring 120 includes the anti-rotation key 124, it is possible, though not preferable, to omit the washer 130 and simply tighten the octagonal nut 102 against the outer roller bearing assembly 24.

Referring now to FIGS. 5, 6 and 8, a third approach to mounting and securing the wheel hub 28 and a pair of tapered roller bearing assemblies 22 and 24 on the spindle 10 according to the present invention will now be described. As in the above described methods, the hub 28, including the inner roller bearing assembly 22 and the oil seal 26 are mounted on the spindle 10, as illustrated in FIG. 5, followed by the outer roller bearing assembly 24 and the flat or non-flat washer 130 with its convex face or surface 134 facing toward the outer end of the spindle 10, as best illustrated in FIG. 5. As noted above, the washer 130 may be omitted. If a flat washer 130 is utilized, the remaining steps are essentially the same as the first method: the nut 102 is threaded on the spindle 18 and tightened down until the desired preload is applied to the inner and outer roller bearing assemblies, the key 124 of the locking ring 120 is located in the keyway 20 and the fasteners 128 are installed and tightened to secure the locking ring 120 to the octagonal nut 102 and prevent its rotation.

The third approach involves use of a dial indicator 150. The dial indicator 150 is installed in a threaded aperture 152 in the nut 102 that is in substantial axial alignment with the outer edge of the non-flat spring washer 130 when both components are installed on the spindle 10. The dial indicator 150 is then zeroed by placing the flat face 108 of the octagonal nut 102 on a smooth, clean, flat surface at which time the dial indicator 150 is zeroed. Next, the octagonal nut 102 is threaded onto the male threads 18 of the spindle 10 and tightened (torqued) down until the dial indicator 150 reads 0.001 inches, 0.0015 inches or a similar desired value as illustrated in FIG. 8. The dial indicator 150 is then removed from the octagonal nut 102.

The octagonal nut 102 has now been tightened (torqued) down so that it is applying a proper and desired preload to the inner roller bearing assembly 22 and the outer roller bearing assembly 24 as indicated by the deformation of the spring washer 130 and the existence and the size of the gap or clearance as measured by the dial indicator 150. Next, the key 124 of the locking ring 120 is aligned with the keyway 20 in the spindle 10 and the locking ring 120 is mounted upon the spindle 10 adjacent the end face 114 of the octagonal nut 102 without rotating the nut 102.

It will be seen in FIGS. 6 and 7 and appreciated that the pattern of threaded openings 116 and the pattern of the arcuate slots 122 are such that no matter what the rotational positions of the octagonal nut 102 and the locking ring 120 (due to the rotational positioning effected by the keyway 20 and the key 124), there are always at least four threaded openings 126 into which the threaded fasteners 128 may be disposed without adjusting the rotational position of the octagonal nut 102 and upsetting the bearing preload previously set. Such alignment may, it should be noted, necessitate reversal of the locking ring 120 on the spindle 10. With the exception of a grease cap or other cosmetic component, the installation of the wheel hub 28 on the spindle 10 is now complete.

FIGS. 9 and 10 illustrate two additional embodiments of the non-flat springs or spring washers 32 and 130. It should be appreciated that other, additional spring or washer configurations may, and likely will, be suitable for use with the present apparatus and method. In FIG. 9, the non-flat washer is a wave washer 160 which defines a repeating, sinuous profile. In FIG. 10, a washer 170 includes a circular groove or channel 172 which receives a stiffly resilient O-ring 174. With both devices, the spring rate can be adjusted, in the case of the wave washer 160 by changing its thickness, increasing or decreasing the number of waves and changing the material, typically a metal alloy from which it is fabricated. In the case of the washer 170, the stiffness of the O-ring 174 can be adjusted by using different materials such as various elastomers and additional O-rings 174 may be disposed in additional grooves or channels 172.

With reference to FIGS. 1 and 2, a typical and exemplary motor vehicle truck tractor or trailer spindle is illustrated and generally designated by the reference number 10. As utilized herein, the term "spindle" means and refers to the terminal portion of either a truck tractor or trailer axle. The spindle 10 includes an oil seal surface 12, an inner bearing surface 14, an outer bearing surface 16 axially spaced from the inner bearing surface 14, a region of male threads 18 on a terminal portion of the spindle 10 and a keyway 20. The spindle 10 may be hollow and receive a drive axle, be plugged with a cylindrical elastomeric seal or be solid.

As noted above, the spindle 10 represents the interface between the stationary structure of the tractor or trailer frame and suspension and the rotating hub, wheel and tire. Thus, the spindle 10 receives and supports an inner tapered roller bearing assembly 22 on the inner bearing surface 14 and an outer tapered roller bearing assembly 24 on the outer bearing surface 16. The inner and outer tapered roller bearing assemblies 22 and 24 as well as an elastomeric oil seal 26 which contacts the oil seal surface 12 on the spindle 10 are, in turn, received within, supported and retained by a hub or wheel hub 28, a portion of which is illustrated in FIG. 1. The wheel hub 28 is circular, may be of various configurations and materials and receives and supports a wheel and tire assembly.

A first embodiment of a washer, nut and locking ring assembly 30 is disposed adjacent the outer tapered roller bearing assembly 24 and includes a flat or non-flat, i.e., frusto-conical or Belleville spring, washer 32. As indicated, the washer 32 may be either flat or have a shape such as a Belleville spring or wave washer that provides a spring biasing or restoring force when compressed. The special benefit to utilizing a spring washer will be described more extensively in the paragraphs devoted to the method of utilization appearing below. The washer 32 defines a circular opening 34 and includes a radially inwardly directed lug or key 36 that is complementary to and received within the keyway 20 of the spindle 10. The inside and outside diameters and the thickness and the angle of offset or conicity of the washer 32 if the washer is a spring washer will vary according to its application. The diameter of the circular opening 34 of the washer 32, that is, the inside diameter of the washer 32, will be determined by the major diameter of the male threads 18 on the terminal portion of the spindle 10.

Preferably, the diameter of the circular opening 34 will be just slightly larger than the major diameter of the male threads 18 on the spindle 10. The thickness of the washer 32, if it is a flat washer, will be determined primarily by its desired strength or, if it is a non-flat, i.e., spring washer, it will be determined primarily by the desired spring rate (constant). In either case, the thickness is preferably in the range of about 0.120 inches (3.05 mm.) to about 0.160 inches (4.06 mm.) or more or less. The axial conicity, if it is a spring washer, will be determined primarily by the desired compressive travel of the washer 32. Typically, the conicity may be in the range of from 0.003 inches (0.076 mm.) to 0.008 inches (0.203 mm.) or more with 0.005 inches (0.127 mm.) having been found to be a useful, average and typical value.

The washer 32, if it is a flat washer, may, of course, be simply placed on the spindle 10, as it is orientation insensitive. If it is a spring washer, in a relaxed state, it is preferably arranged on the spindle 10 with the convex face or surface 38A facing inward and the concave face 38B facing outward, that is, with the inner diameter more proximate the bearing surface 16 and the roller bearing assembly 24. It will be appreciated that, if it is a spring washer, the conicity, i.e., the non-flat shape, of the washer 32 has been exaggerated somewhat in FIG. 1, for purposes and reasons of explanation and clarity. It should also be appreciated that a non-flat, i.e., spring, washer 32 may be installed in the opposite direction on the spindle 10 such that it faces the opposite way as will be described subsequently.

An octagonal nut and integral locking ring assembly 40 includes an octagonal nut 42 having a plurality of, preferably eight, flats 44. While both the length of the flats 44 and the maximum apex to apex diametral distance of an eight sided, i.e., octagonal, nut 42 has been found optimum, and in fact preferred, for this service, it should be understood that more or fewer flats 44 on the nut 42, for example, six, ten or twelve may be utilized. Adjacent the flats 44, the octagonal nut 42 includes a circular flange 46 having a flat, end face or surface 48. The octagonal nut 42 includes an axial circular aperture 50 having female threads 52 which are complementary to the male threads 18 on the terminal portion of the spindle 10. Disposed about the circular aperture 50, preferably in a bolt circle or similar array, are a plurality of axially oriented threaded blind openings 54. As illustrated in FIG. 2, there are preferably four threaded blind openings 54 but it should be understood that more or fewer threaded openings 54 may be utilized if desired.

Figure 11:
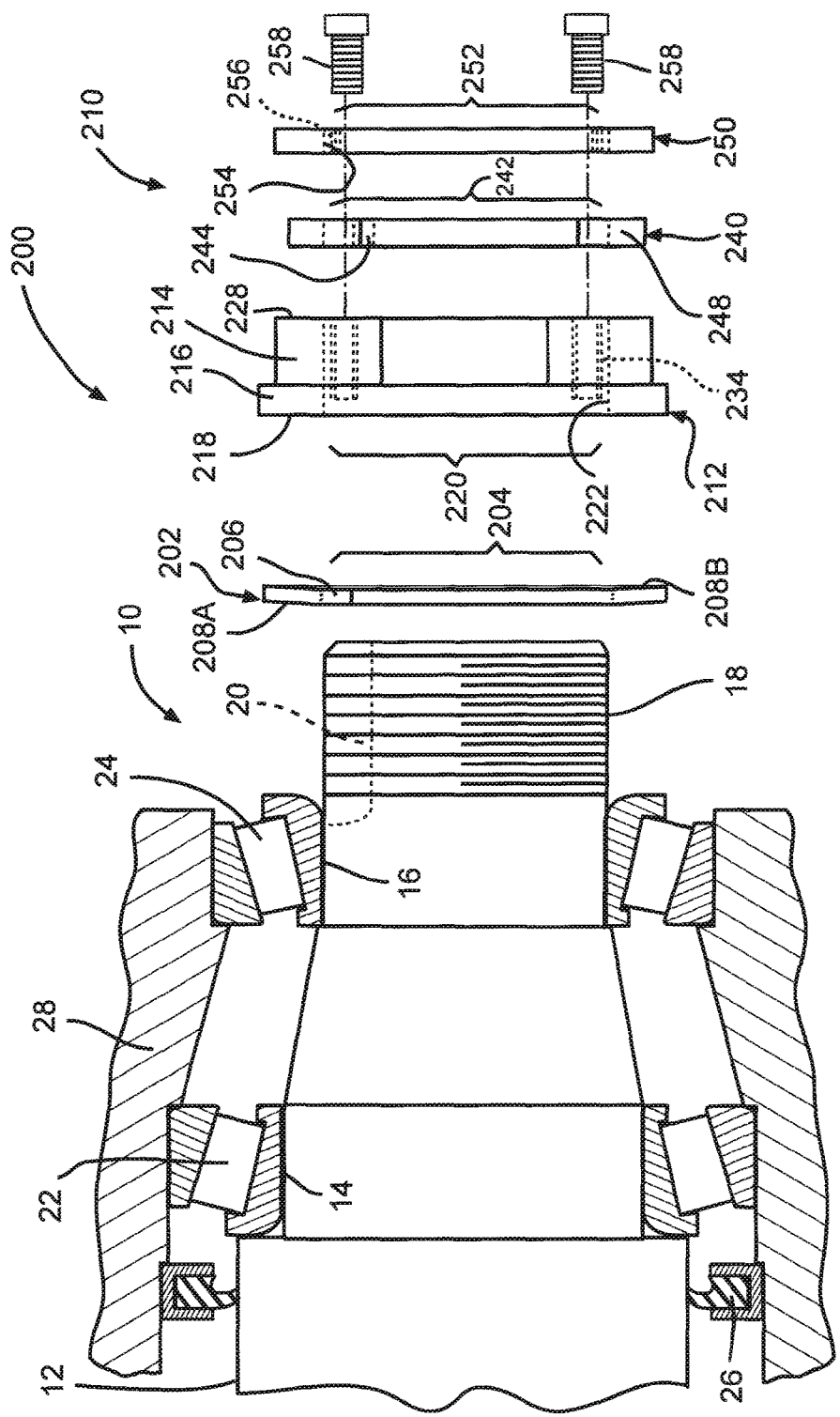
FIG. 11 is an exploded, side elevational view of a motor vehicle axle (spindle) and an alternate embodiment washer and inner nut, locking ring and outer nut assembly according to the present invention.
Figure 12:
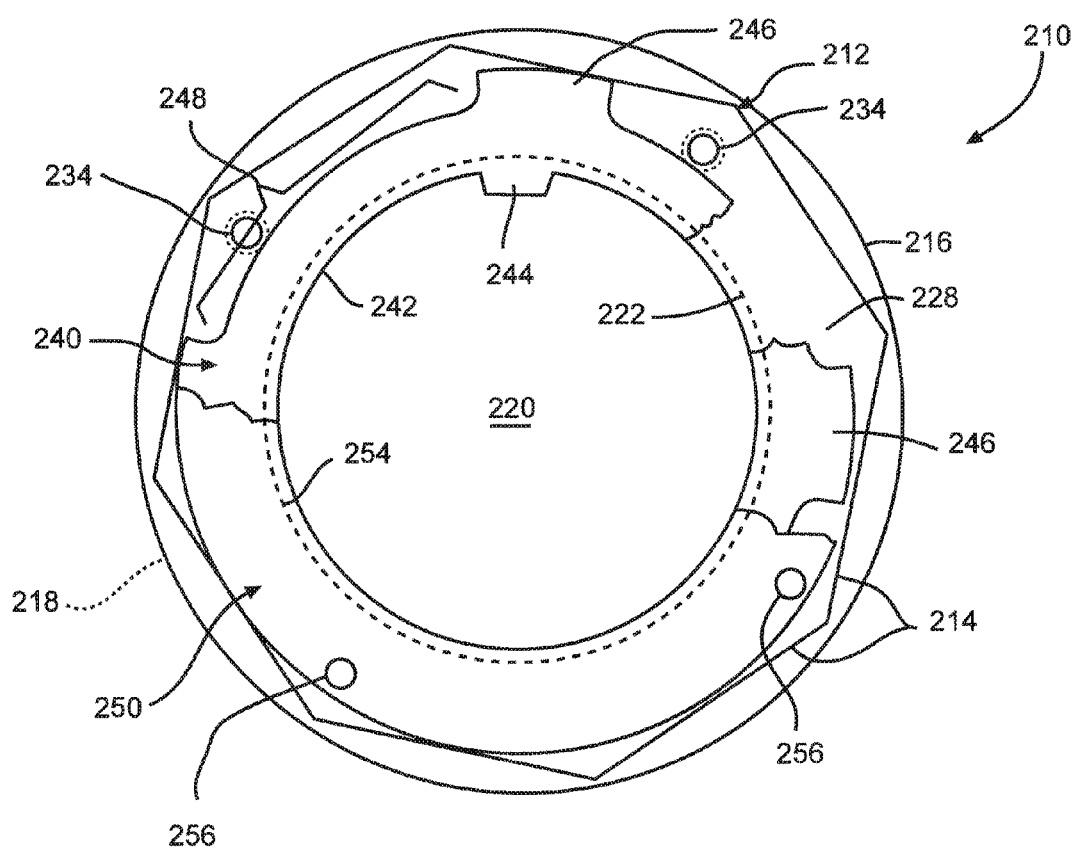
FIG. 12 is a plan view of the alternate embodiment inner nut, locking ring and outer nut assembly of FIG. 11 with portions of the locking ring and outer nut broken away.

With reference now to FIGS. 11 and 12, the typical and exemplary motor vehicle truck tractor or trailer spindle is again illustrated and generally designated by the reference number 10. As utilized herein, the term "spindle" means and refers to the terminal portion of either a truck, tractor or trailer axle. A noted above, the spindle 10 includes the oil seal surface 12, the inner bearing surface 14, the outer bearing surface 16 axially spaced from the inner bearing surface 14, the region of male threads 18 on a terminal portion of the spindle 10 and the keyway 20. The spindle 10 may be hollow and receive a drive axle, be plugged with a cylindrical elastomeric seal or be solid.

As also noted above, the spindle 10 represents the interface between the stationary structure of the tractor or trailer frame and suspension and the rotating hub, wheel and tire. Thus, the spindle 10 receives and supports the inner tapered roller bearing assembly 22 on the inner bearing surface 14 and the outer tapered roller bearing assembly 24 on the outer bearing surface 16. The inner and outer tapered roller bearing assemblies 22 and 24 as well as the elastomeric oil seal 26 which contacts the oil seal surface 12 on the spindle 10 are, in turn, received within, supported and retained by the hub or wheel hub 28, a portion of which is illustrated in FIG. 11. The wheel hub 28 is circular, may be of various configurations and materials and receives and supports a wheel and tire assembly.

Another embodiment of a hub retaining nut and locking washer assembly 200 is disposed adjacent the outer tapered roller bearing assembly 24 and may include a rear or inner flat or non-flat, i.e., frusto-conical or Belleville spring, washer 202. As indicated, the washer 202 may be either flat or have a shape such as a Belleville spring or wave washer that provides a spring biasing or restoring force when compressed. It should be appreciated that incorporation of the rear or inner washer 202 in this embodiment is optional as will be explained more fully below in the paragraphs devoted to the method of utilization. The rear or inner washer 202 defines a circular opening 204 and includes a radially inwardly directed lug or key 206 that is complementary to and received within the keyway 20 of the spindle 10. The inside and outside diameters, the thickness and the angle of offset or conicity of the washer 202, if the washer is a spring washer, will vary according to its application. The diameter of the circular opening 204 of the rear or inner washer 202, that is, the inside diameter of the washer 202, will be determined by the major diameter of the male threads 18 on the terminal portion of the spindle 10.

Preferably, the diameter of the circular opening 204 will be just slightly larger than the major diameter of the male threads 18 on the spindle 10. The thickness of the washer 202, if it is a flat washer, will be determined primarily by its desired strength or, if it is a non-flat, i.e., spring washer, it will be determined primarily by the desired spring rate (constant). In either case, the thickness is preferably in the range of about 0.120 inches (3.05 mm.) to about 0.160 inches (4.06 mm.) or more or less. The axial conicity, if it is a spring washer, will be determined primarily by the desired compressive travel of the washer 202. Typically, the conicity may be in the range of from 0.003 inches (0.076 mm.) to 0.008 inches (0.203 mm.) or more with 0.005 inches (0.127 mm.) having been found to be a useful, average and typical value.

The rear or inner washer 202, if it is a flat washer, may, of course, be simply placed on the spindle 10, as it is orientation insensitive. If it is a spring washer, in a relaxed state, it is preferably arranged on the spindle 10 with the convex face or surface 208A facing inward and the concave face 208B facing outward, that is, with the inner diameter more proximate the bearing surface 16 and the roller bearing assembly 24. It will be appreciated that, if it is a spring washer, the conicity, i.e., the non-flat shape, of the washer 202 has been exaggerated somewhat in FIG. 11, for purposes and reasons of explanation and clarity. It should also be appreciated that a non-flat, i.e., spring, washer 202 may be installed in the opposite direction on the spindle 10 such that it faces the opposite way as will be described subsequently.

An octagonal nut, locking washer and outer nut assembly 210 includes a first or inner octagonal nut 212 having a plurality of, preferably eight, flats 214. While both the tangential length of the flats 214 and the maximum apex to apex diametral distance of an eight sided, i.e., octagonal, nut 212 has been found optimum, and in fact preferred, for this service, it should be understood that more or fewer flats 214 on the inner nut 212, for example, six, ten or twelve may be utilized. Adjacent the flats 214, the inner octagonal nut 212 includes a circular flange 216 having a first flat, inner, end face or surface 218. The inner octagonal nut 212 includes an axial circular aperture or opening 220 having female threads 222 which are complementary to the male threads 18 on the terminal portion of the spindle 10. The first inner octagonal nut 212 also includes a second flat, outer end face or surface 228 on the end of the octagonal nut 212 opposite the first end face or surface 218. Disposed on the second, flat end face or surface 228, about the circular aperture 220, preferably in a bolt circle or similar array, are a plurality of axially oriented threaded blind openings 234. As illustrated in FIG. 2, there are preferably four threaded blind openings 234 but it should be understood that more or fewer, for example, three, six or eight, threaded openings 234 may be utilized if desired.

Located adjacent the second end face or surface 228 and in contact therewith is a locking ring or washer 240. The locking ring or washer 240 may be one of several designs or configurations set forth in this Figures, FIGS. 13, 14, 15 and 16 and the text appearing below. The locking ring or washer 240 includes a center aperture or opening 242 which has a diameter just slightly larger than the outside diameter of the male threads 18 on the spindle 10, a radially inwardly direct tab or key 244 which is received within the keyway 20 of the spindle 10 when installed thereon and a plurality of radially outwardly directed tabs or lugs 246. Preferably, there are four tabs or lugs 246 but, in any event, the number of tabs or lugs 246 (and the number of spaces 248 therebetween) should be equal to the number of threaded openings 234 in the inner octagonal nut 212.

Last of all, the octagonal nut, locking washer and outer nut assembly 210 includes a second flat outer nut 250. The second or outer nut 250 includes a center aperture or opening 252 having female threads 254 which are complementary to the male threads 18 on the terminal portion of the spindle 10 and thus identical to the female threads 222 of the octagonal nut 212. The second or outer nut 250 also includes a plurality of through openings 256 disposed about the circular aperture or opening 252, in a bolt circle or similar array, identical to the arrangement of the threaded blind openings 234 in the first or inner octagonal nut 212. Preferably, there are four through openings 256 but it should be understood that while more or fewer through openings 256 may be utilized, the number should match the number of threaded blind openings 234 in the octagonal nut 212. A plurality of, preferably four, threaded fasteners 258 such as set screws, cap screws or machine bolts extends through the through openings 256 in the second or outer nut 250, through the spaces 248 in the locking washer 240 and into the threaded openings 234 in the first or inner octagonal nut 212.

Figure 13:
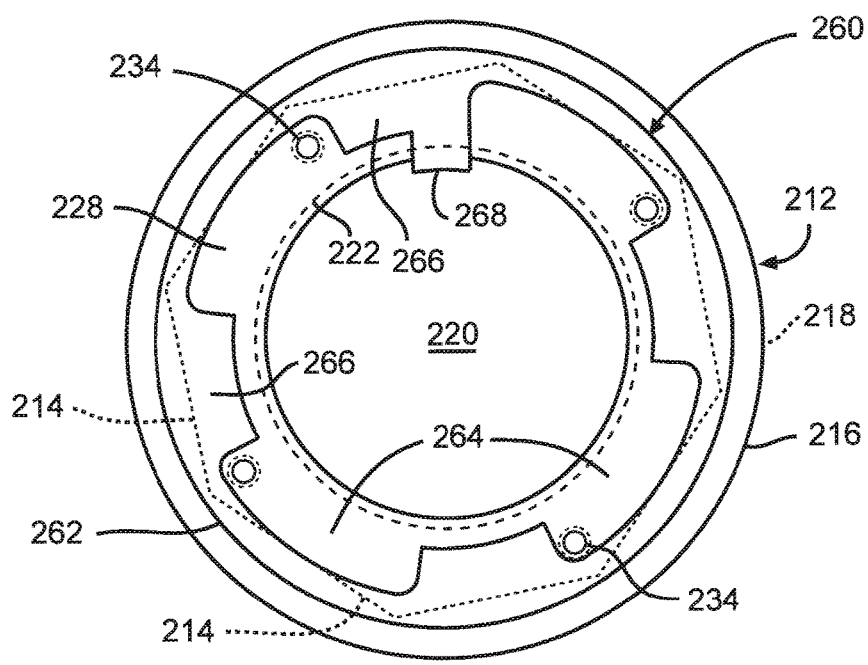
FIG. 13 is a plan view of an alternate embodiment locking ring according to the present invention having large internal notches.

Turning then to FIG. 13, another locking ring or washer embodiment 260 is illustrated in position on the first or inner octagonal nut 212. The inner octagonal nut 212 includes the flats 214, the circular flange 216 having a first flat inner end face or surface 218, the axial circular aperture or opening 220, the female threads 222, the second flat end outer end face or surface 228 and the plurality of threaded blind openings 234. The locking ring or washer 260 includes a circular outer periphery or edge 262 and an inner edge defined by four wide slots or notches 264 each extending over approximately 50° to 55° and which define intermediate tabs or lugs 266. One of the tabs or lugs 266 includes a radially inwardly extending key 268 which is received within the keyway 20 of the spindle 10 (illustrated in FIG. 11). With the option described above of reversing the orientation of, i.e., flipping, the locking ring or washer 260, the slots or notches 264 and the key 268 are sized and arranged so that the threaded fasteners 258 (illustrated in FIG. 1) may be readily threaded into the threaded blind openings 234 regardless of the rotational position of the inner octagonal nut 212 relative to the keyway 20 on the spindle 10.

Figure 14:
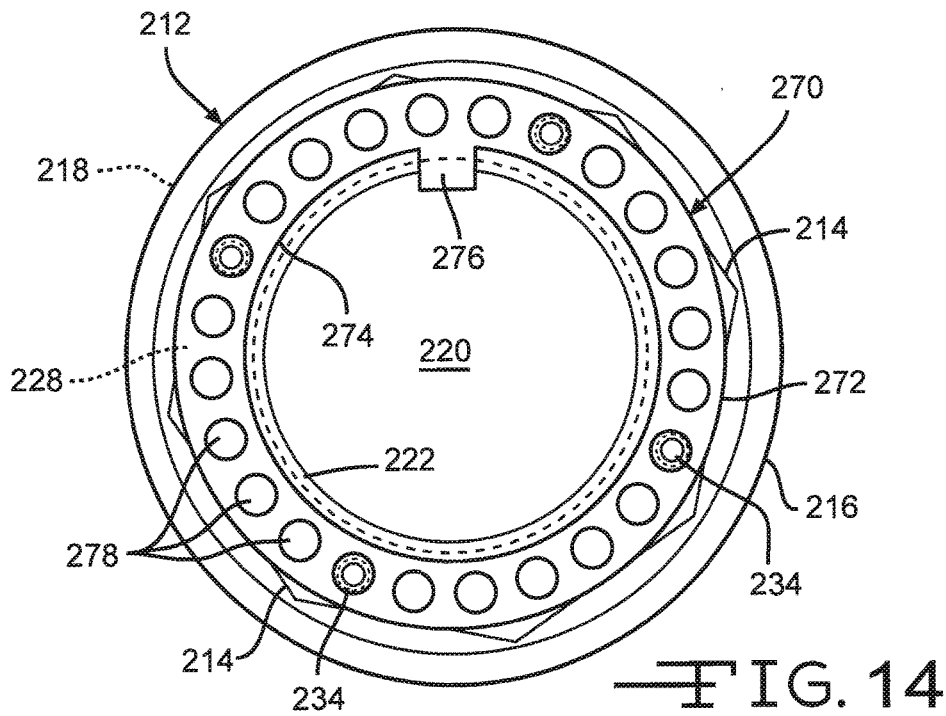
FIG. 14 is a plan view of an alternate embodiment locking ring according to the present invention having a plurality of through openings.

Turning then to FIG. 14, yet another locking ring or washer embodiment 270 is illustrated in position on the first or inner octagonal nut 212. The inner octagonal nut 212 includes the flats 214, the circular flange 216 having a first flat inner end face or surface 218, the axial circular aperture or opening 220, the female threads 222, the second outer flat end surface 228 and the plurality of threaded blind openings 234. The locking ring or washer 270 includes a circular outer periphery or edge 272 and a circular inner edge 274 interrupted by a single radially inwardly directed key 276. Between the outer edge 272 and the inner edge 274 reside a plurality of through openings 278 arranged to align with the blind threaded openings 234 in the inner octagonal nut 212. Preferably, there are 24 through openings 278 such that mounting increments of 15° are achieved. Moreover, the single key 276 is not radially aligned with either the openings 278 or the space therebetween but is offset approximately 3.75° so that, once again, with either an initial or reversed orientation of the locking ring or washer 270, the key 276 of the locking ring or washer 270 can be installed in the keyway 20 and the threaded fasteners 258 installed in the threaded blind openings 234 without significantly disturbing the rotational position of the inner octagonal nut 212.

Figure 15:
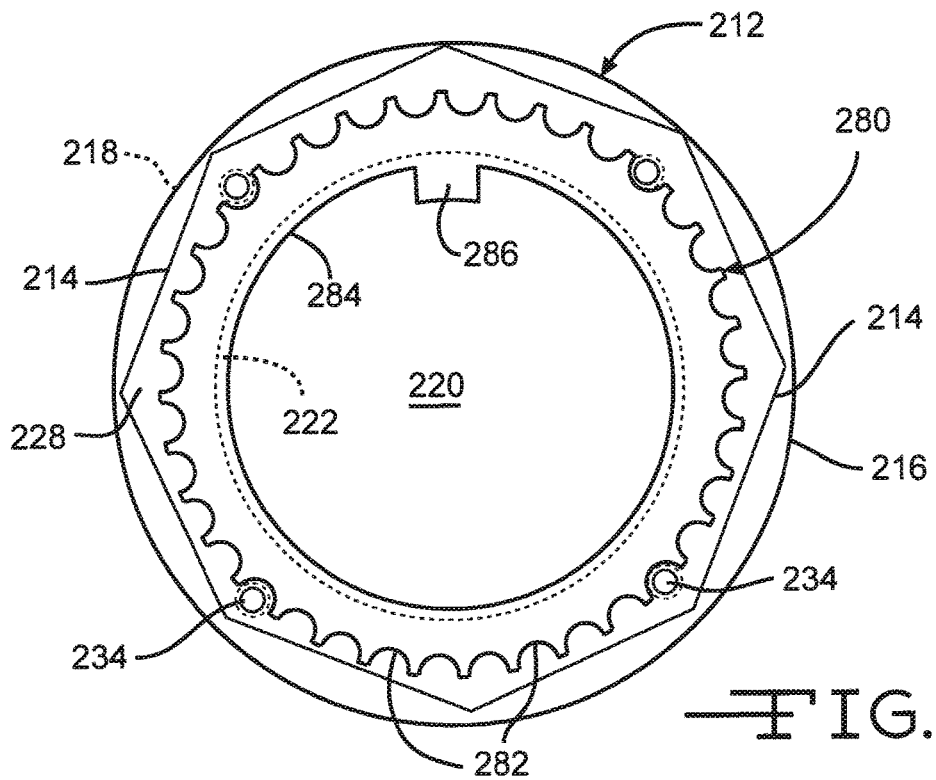
FIG. 15 is a plan view of an alternate embodiment locking ring according to the present invention having a plurality of small exterior scallops or notches.

With reference now to FIG. 15, another locking ring or washer embodiment 280 is illustrated in position on the first or inner octagonal nut 212. The inner octagonal nut 212 includes the flats 214, the circular flange 216 having a first flat end face or surface 218, the axial circular aperture or opening 220, the female threads 222, the second flat end surface 228 and the plurality of threaded blind openings 234. The locking ring or washer 280 includes an outer periphery defining a plurality of scallops or semi-circular notches 282 having centers which align with the threaded blind openings 234 in the inner octagonal nut 212. The inner edge 284 is circular and defines a single radially inwardly directed key 286. Preferably, there are 36 semi-circular notches 282 such that mounting increments of 10° are achieved. Moreover, the single key 286 is not radially aligned with either the semi-circular notches 282 or the spaces therebetween but is offset approximately 2.5° so that, once again, with either an initial or reversed orientation of the locking ring or washer 280, the key 286 of the locking ring or washer 280 can be installed in the keyway 20 and the threaded fasteners 258 installed in the threaded blind openings 234 without significantly disturbing the rotational position of the inner octagonal nut 212.

Figure 16:
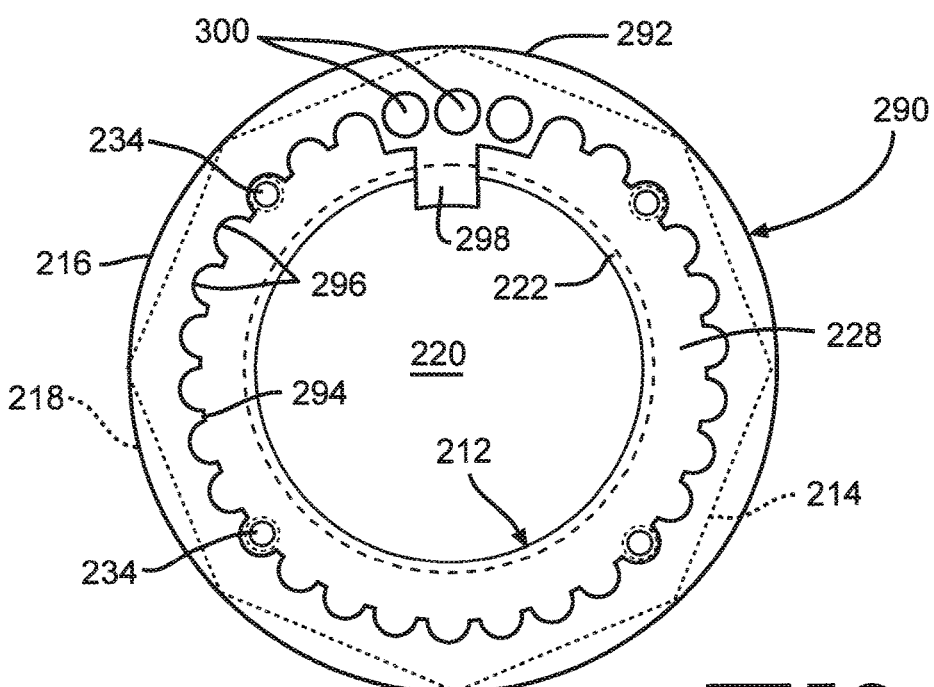
FIG. 16 is a plan view of an alternate embodiment locking ring according to the present invention having a plurality of small interior scallops or notches.

With reference now to FIG. 16, yet another locking ring or washer embodiment 290 is again illustrated in position on the first or inner octagonal nut 212. The inner octagonal nut 212 includes the flats 214, the circular flange 216 having a first flat end face or surface 218, the axial circular aperture or opening 220, the female threads 222, the second flat end surface 228 and the plurality of threaded blind openings 234. The locking ring or washer 290 includes a circular outer periphery or edge 292 and an inner edge 294 which defines a plurality of scallops or semi-circular notches 296 having centers which align with the threaded blind openings 234 in the inner octagonal nut 212. The inner edge 294 of the locking ring or washer 290 also defines a single radially inwardly directed key 298. The scallops or semi-circular notches 296 are disposed at 12° intervals such that there would be thirty notches 296 about the inner edge 294 if they extended completely thereabout. However, the single key 298 occupies approximately 40° so there are but 27 semi-circular notches disposed over approximately 320°. It should be understood that the three through holes 300 adjacent the single key 298 illustrated in FIG. 16 complete the pattern of fastener or machine screw receiving spaces or features so that in essentially any rotational position of the locking ring or washer 290 relative to the inner octagonal nut 212, the threaded fasteners 258 may be readily installed.

Once again, the single key 298 is not radially aligned with either the semi-circular notches 296 or the spaces therebetween but is offset approximately 3° so that, again, with either an initial or reversed orientation of the locking ring or washer 290, the key 298 of the locking ring or washer 290 can be installed in the keyway 20 and the threaded fasteners 258 installed in the threaded blind openings 234 without significantly disturbing the rotational position of the inner octagonal nut 212, as noted directly above.

The method of installation of the hub retaining nut and locking washer assembly 200 including the inner octagonal nut, locking washer and outer nut assembly 210 which is in many respects the same or similar to the installation methods described above in connection with FIGS. 1, 4, 5 and 8, will now be described.

Referring now to FIG. 11, the rear or inner washer 202, if it is utilized, is placed over the end of the spindle 10, with the key 206 in the keyway 20 and translated to a position adjacent the outer bearing assembly 24. The key 206 of the rear washer 202 prevents its rotation and thus minimizes energy transfer from a rotating bearing assembly, such as the outer roller bearing assembly 24 to the other components of the hub retaining nut and locking washer assembly 200. The keyway 20 in certain spindles 10 may not extend far enough axially into the spindle 10 to allow a washer 202 having a key 206 to seat fully against the outer bearing assembly 24, in which case a washer 202 which does not include the key 206 must be utilized. Additionally, if the inner or rear washer 202 is a Belleville washer, it should be installed as described above with reference to FIG. 4 so that deflection and preload may be checked with a feeler gauge 82 or installed as described above with reference to FIG. 8 so that deflection and preload may be checked with a dial indicator 150.

Next, the first or inner octagonal nut 212 is threaded onto the end of the spindle 10 and tightened against the rear washer 202, if it is utilized, or the outer bearing assembly 24, if it is not. Axial preload or bearing end play may then be adjusted, in accordance with the above description related to FIGS. 4 and 8. Then, one of the five locking ring or washer configurations, 240, 260, 270, 280 or 290 is placed on the spindle 10 adjacent the second outer end surface 228 of the inner octagonal nut 212. Next, the flat second or outer nut 250 is first snugly threaded against the selected lock washer installed in the previous step and then it is backed off, that is, rotated in the reverse direction, approximately one-half turn. Finally, the plurality of threaded fasteners 258 are installed through the openings 256 in the flat outer nut 250, through the features or openings of the selected lock washer 240, et seq., and into the threaded blind openings 234 in the inner octagonal nut 212.

If the internal or external slotted lock ring or washer configurations 240 or 260 have been selected and the threaded openings 234 are covered, the flat outer nut 250 is removed, and the locking ring or washer 240 or 260 is reversed of flipped over and re-installed and the flat outer nut 250 installation (snugly tightened, backed off one-half turn) is repeated. The spaces 248 between the lugs 246 in the lock washer 240 and the spaces 268 between the lugs 266 in the lock washer 260 allow for infinite rotational adjustment of the components of the octagonal nut, locking washer and outer nut assembly 210. It should be appreciated that when either slotted locking ring or washer 240 or 260 is utilized, if the outer roller bearing assembly 24 begins to fail and apply torque to the inner face 218 of the inner octagonal nut 212, the inner and outer nuts 212 and 250 may rotate as much as approximately 45°, depending upon their installed rotational location, before the edges of the lugs 266 engage the threaded fasteners 258 and prevent further rotation.

If the locking ring or washer 270 with openings 278 or the internally or externally scalloped locking ring or washer 280 or 290 has been selected, because, as noted, the keys 276, 286 and 298, respectively, are offset, i.e., not aligned with the openings or spaces therebetween, by initial or reversed mounting of the locking ring or washer 270, 280 or 290 on the spindle 10 increments, as noted above, as small as 2.5° to 3.0° can be accommodated without rotating and upsetting the desired rotational location of the inner octagonal nut 212. It should be appreciated that when one of the locking ring or washer 270 with openings 278 or the externally or internally scalloped locking ring or washer 280 or 290 is utilized, if the outer roller bearing assembly 24 begins to fail and apply torque to the inner face 218 of the inner octagonal nut 212, minimal rotation of only a few degrees of the inner and outer nuts 212 and 250 will occur before the edges of the openings 278 or the notches 282 and 296 engage the threaded fasteners 258 and prevent further rotation.

Figure 17:
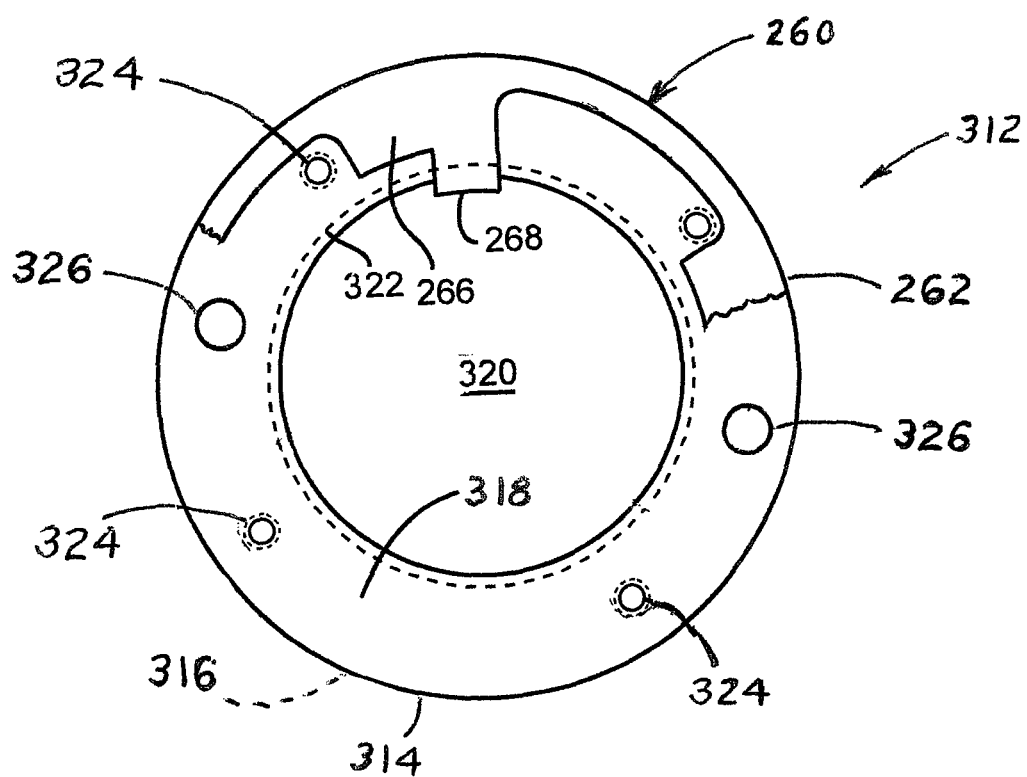
FIG. 17 is a plan view of another embodiment of an inner nut and portion of a locking ring suitable for installation and use on lighter duty trucks with the outer nut assembly of the present invention.

With reference now to FIG. 17, another embodiment of the inner nut is illustrated and generally designated by the reference number 312. This embodiment of the inner nut 312 is especially suited and adapted for installation and use on lighter duty trucks such as commercial vans, pickup trucks and the like having spindles of smaller diameters than commercial, long-haul tractors and trailers. The smaller inner nut 312 includes a cylindrical outer surface 314, a flat inner face or surface 316 and a parallel, flat outer face or surface 318. The inner nut 312 also includes a center, axial opening 320 having female threads 322 which are complementary to and engage male threads, such as the threads 18 on a smaller diameter spindle like the spindle 12 illustrated in FIG. 11.

On the flat outer face or surface 318 are a plurality of, preferably four, axially oriented threaded blind openings 324 arranged in a bolt circle about the center axial opening 320. It should be understood that more or fewer of the threaded openings 324 may be utilized if desired. Also on the flat outer face or surface 318 of the inner nut 312 and arranged on a line of diameter, i.e., diametrically opposed, are a pair of blind, unthreaded, axially oriented openings 326 suitable for receiving the pins of a conventional spanner wrench. Thus, this embodiment of the inner nut 312 may be readily engaged, rotated and tightened on the spindle 12 with a spanner wrench.

Also illustrated in FIG. 17 is a portion of a locking ring 260. The locking ring 260 illustrated in FIG. 17 is the same configuration as and includes all the features of the locking ring illustrated in FIG. 13 except that it is smaller in diameter to mate and function with the smaller inner nut 312 and a smaller diameter spindle utilized on lighter duty trucks. Accordingly, it includes the circular outer periphery or edge 262 and an inner edge defined by four wide slots or notches 264 each extending over approximately 50° to 55° and which are defined by intermediate tabs or lugs 266. One of the tabs or lugs 266 includes a radially inwardly extending key 268 which is received within the keyway 20 of the spindle 10 (illustrated in FIG. 11).

It should be appreciated that although only the locking ring 260 is illustrated in FIG. 17 with the smaller inner nut 312, all of the other locking ring configurations 240, 270, 280 and 290 are equally suitable for use with the smaller inner nut 312 assuming, of course, that they are of correspondingly smaller size. The configuration and features of the outer nut 250, illustrated in FIGS. 11 and 12 and used with the smaller inner nut 312, is likewise the same but of correspondingly smaller size. The method of installation on a smaller truck spindle is also essentially the same as that described above except that a spanner wrench is utilized to rotate and tighten the inner nut 312 against the outer roller bearing assembly 24 rather than an open end or box end wrench.

The description of the invention is merely exemplary in nature and variations that do not depart from the gist of the invention are intended to be, and are, within the scope of the invention and the following claims. Such variations are not to be regarded as a departure from the spirit and scope of the invention.

What is claimed is:

1. A spindle nut assembly comprising, in combination,
a first nut having a first end face and a second end face, a first center opening including female threads extending between said first end face and said second end face and a plurality of threaded openings extending into said first nut from said second end face,
a locking ring disposed adjacent said second end face, said locking ring defining a center through opening, a key extending radially inwardly into said center through opening and a plurality of projections defining fastener receiving spaces therebetween,
a second nut having a face disposed adjacent said locking ring, a second center opening including female threads and a second plurality of openings aligned with said first plurality of threaded openings, and
a plurality of threaded fasteners disposed in said second plurality of openings and extending through said fastener receiving spaces of said locking ring into said plurality of threaded openings in said first nut.

2. The spindle nut assembly of claim 1 further including a vehicle spindle having at least one bearing assembly and wherein said spindle nut assembly is disposed on said vehicle spindle adjacent said bearing.

3. The spindle nut assembly of claim 1 wherein said threaded fasteners are machine screws.

4. The spindle nut assembly of claim 1 further including a washer disposed adjacent said first end face of said first nut.

5. The spindle nut assembly of claim 4 wherein said washer is one of a flat washer, a Belleville spring, and a wave washer.

6. The spindle nut assembly of claim 1 wherein said projections are disposed about a periphery of said locking ring and said fastener receiving spaces are disposed about said periphery between said projections.

7. A spindle nut assembly comprising, in combination,
an inner nut having a first end face, a second end face, an axially oriented first center opening having female threads extending between said end faces and an inner plurality of axially oriented threaded openings in said second end face disposed about said first center opening,
a locking washer disposed adjacent said second end face, said locking washer having a center opening, a key extending radially inwardly into said center opening of said locking washer and a plurality of projections defining fastener receiving spaces between adjacent projections,
an outer nut disposed adjacent said locking washer, an axially oriented second center opening including female threads and an outer plurality of openings complementary to said inner plurality of threaded openings, and
a plurality of threaded fasteners disposed in said outer plurality of openings in said outer nut, extending through said fastener receiving spaces of said locking washer and into said inner plurality of threaded openings in said inner nut.

8. The spindle nut assembly of claim 7 wherein said inner nut includes one of wrench engageable features including a plurality of peripheral flats and a pair of unthreaded axial openings in said second face.

9. The spindle nut assembly of claim 7 further including a washer disposed adjacent said first end face of said inner nut and wherein said washer is one of a flat washer, a Belleville spring, a wave washer and a washer having an elastomeric insert.

10. The spindle nut assembly of claim 7 wherein said projections are disposed about a periphery of said locking washer and said fastener receiving spaces are disposed about said periphery between said projections.

11. The spindle nut assembly of claim 7 further including a vehicle spindle having at least one bearing assembly and wherein said spindle nut assembly is disposed on said vehicle spindle adjacent said one bearing assembly.

12. A spindle nut assembly comprising, in combination,
an first nut having a first end face, a second end face, a through center opening having female threads extending between said end faces and a first plurality of threaded openings in said second end face parallel to and disposed about said center opening,
a locking washer adjacent said second end face of said first nut, said locking washer having a center opening, a key extending into said center opening and a plurality of circumferentially spaced apart fastener receiving openings,
a second nut adjacent said locking washer, a second center opening including female threads and a second plurality of openings complementary to said first plurality of threaded openings in said first nut, and
a plurality of threaded fasteners disposed in said second plurality of openings of said second nut, extending through said fastener receiving openings of said locking washer and into said first plurality of threaded openings in said first nut.

13. The spindle nut assembly of claim 12 wherein said first nut includes one of wrench engageable features including a plurality of peripheral flats and a pair of unthreaded axial openings in said second face.

14. The spindle nut assembly of claim 12 further including a washer disposed adjacent said first end face of said first nut and wherein said washer is one of a flat washer, a Belleville spring, a wave washer and a washer having an elastomeric insert.

15. The spindle assembly of claim 12 wherein said fastener receiving openings are disposed in said locking washer.

16. The spindle nut assembly of claim 12 wherein said fastener receiving openings are disposed about a periphery of said locking washer and are separated by radially outwardly extending projections.

* * * * *